United States Patent [19]

Goguen

[11] Patent Number: 4,629,583
[45] Date of Patent: Dec. 16, 1986

[54] PHOSPHORESCENT POLYMER-CONTAINING COMPOSITIONS AND ARTICLES MADE THEREFROM

[75] Inventor: Peter J. Goguen, Fitchburg, Mass.

[73] Assignee: Jones and Vining, Incorporated, Leominster, Mass.

[21] Appl. No.: 743,528

[22] Filed: Jun. 11, 1985

[51] Int. Cl.$^4$ .................. C09K 11/02; A43B 13/00; B29B 7/00; B29C 45/00

[52] U.S. Cl. .................. 252/301.35; 36/25 R; 264/328.1

[58] Field of Search ............. 252/301.36; 264/328.1; 36/25 R

[56] References Cited

U.S. PATENT DOCUMENTS

| | | | |
|---|---|---|---|
| 2,341,085 | 2/1944 | Dohoney | 36/25 R |
| 2,631,243 | 3/1953 | Weber | 252/301.36 |
| 2,650,169 | 8/1953 | Goldstein | 252/301.36 |
| 2,654,971 | 10/1953 | Harrison | 252/301.36 |
| 2,887,794 | 5/1959 | Masera | 36/25 R |
| 3,565,815 | 2/1971 | Christy | 252/301.36 |
| 3,634,280 | 1/1972 | Dean et al. | 252/301.36 |
| 4,216,132 | 8/1980 | Zweige et al. | 260/33.6 AQ |
| 4,332,760 | 6/1982 | Warfel | 264/143 |
| 4,544,519 | 10/1985 | Schilke | 264/328.1 |

FOREIGN PATENT DOCUMENTS 54-124066  9/1979  Japan .................. 264/328.1

*Primary Examiner*—Arthur P. Demers
*Attorney, Agent, or Firm*—Darby & Darby

[57] ABSTRACT

This invention relates to phosphoresent, polymer-containing compositions suitable for use in footwear and to phosphorescent shoes, shoe soles, and other molded or extruded shoe parts made from such compositions.

One aspect of this invention is directed to a polymeric composition comprising:
  (a) between about 25 and 75% by weight of an elastomeric polymer;
  (b) between about 20 and 50% by weight of a processing oil;
  (c) between about 0.005 and 0.5% by weight of at least one stabilizer; and
  (d) between about 3 and 30% by weight of a phosphorescent pigment. This invention relates to phosphoresent, polymer-containing compositions suitable for use in footwear and to phosphorescent shoes, shoe soles, and other molded or extruded shoe parts made from such compositions.

8 Claims, No Drawings

PHOSPHORESCENT POLYMER-CONTAINING COMPOSITIONS AND ARTICLES MADE THEREFROM

BACKGROUND OF THE INVENTION

This invention relates to phosphorescent polymer-containing compositions and to phosphorescent articles made from such compositions in whole or in part.

More particularly, this invention relates to phosoresent, polymer-containing compositions suitable for use in footwear and to phosphorescent shoes, shoe soles, and other molded or extruded shoe parts made from such compositions.

Polymers and in particular thermoplastic elastomers and compositions containing them have been widely used to make a variety of articles, especially footwear. These polymers and polymeric compositions are used for shoes, soling, foxing, etc.

A great number of patents have been issued that are directed to such compositions and methods for making them. Examples are U.S. Pat. Nos. 4,216,132 of Zweig issued on Aug. 5, 1980 and entitled HDPE-Containing Footwear Compositions, and 4,332,760 of Warfel issued on June 1, 1982 and entitled Direct Production of Elastomer Compounds From Reactor Solution.

The disclosures of both of the above patents are incorporated by reference in this application.

SUMMARY OF THE PRESENT INVENTION

One aspect of this invention is directed to a polymeric composition comprising:

(a) between about 25 and 75% by weight of an elastomeric polymer;

(b) between about 20 and 50% by weight of a processing oil;

(c) between about 0.005 and 0.5% by weight of at least one stabilizer; and (d) between about 3 and 30% by weight of a phosphorescent pigment.

Another aspect of the present invention relates to phosphorescent articles, in particular, shoes, shoe soles and other shoe parts made from the above compositions, said articles having the property of glowing in the dark for a period of time following their exposure to light.

DETAILED DESCRIPTION OF THE INVENTION

The polymer-containing compositions of the present invention preferably comprise one or more of each of the following constitutents: elastomeric polymers, processing and/or extending oils, inorganic additives, stabilizers, preservatives, and colorants including phosphorescent compounds. They preferably also comprise modifying polymers, dry blend flow modifiers and, optionally, reinforcing and/or extending fillers.

The phosphorescent compounds impart phosphorescence to these compositions and to articles made therefrom. This permits the articles to glow in the dark for a period of time following their exposure to light. Such phosphorescense is manifested by a short period of intense glow (immediately following exposure of the article or composition to light) followed by a less intense afterglow that persists for several hours. Upon renewed exposure to light, the material absorbs enough light energy to exhibit the glowing property once again.

Phosphorescence enables the wearers of shoes made from, or having soles made from, the compositions of the present invention to be easily identified at night and avoided by on-coming traffic. Such shoes find particular use by pedestrians and bicyclists.

In addition, children are intrigued by the phosphorescence and are inclined to wear phosphorescent and phosphescentsole shoes more than plain shoes and tend to learn how to put them on faster.

In accordance with the present invention, the phosphorescent pigment is incorporated throughout the polymeric composition. Therefore, it is not removed by abrasion and does not disappear with wear of the shoes. If the shoes get dirty, which may cause their ability to phosphoresce to dull or even disappear, they may be restored to phosphorescence by cleaning.

The most preferred phosphorescent compounds suitable for use in this invention are phosphorescent pigments, such as zinc sulfide copper compounds. One such compound is P-1000 supplied by Conrad-Hanovia, Inc., Newark, N.J. Another suitable compound is 6 SSU, supplied by United Mineral and Chemical Corporation, New York, N.Y.

The elastomeric polymers contained in the composition of the present invention provide the elastomeric matrix to which other components are added. Preferably, these polymers are styrenic block copolymers and most preferably monoalkenylarene copolymers, such as those described in the aforementioned patents. A particularly preferred polystyrene polybutadiene block copolymer is Kraton 4122 manufactured by the Shell Chemical Company.

The processing oil, or oils act as viscosity modifiers (plasticizers) of the mixture and facilitate flow and processing. They also act as extenders. Naphthenic hydrocarbon oils are preferred for this purpose, although certain aliphatic oils may also be used. Specific plasticizers include but are not limited to Shell Flex 311 produced by the Shell Chemical Company.

The modifying polymers incorporated in the present composition serve to enhance melt flow of the composition as well as strength, abrasion resistance, durability and surface finish of the articles made from such compositions. Preferred are high density polyethylene, ethylene vinylacetate, polybutadiene resins, high stryene resins, poly(alpha-methylstyrene) resin, crystal polystyrene resin, high impact styrene polymers and co-polymers, and mixtures thereof. A particularly preferred mixture is one containing poly(alpha-methylstyrene), and crystal polystyrene or a high-impact styrene polymer or copolymer (such as a copolymer of styrene and acrylonitrile). Amoco 18-290 resin, a poly(alpha-methylstyrene) resin manufactured by Amoco Chemicals Corporation, and Polysar 220, a crystal polystryene resin manufactured by Polysar Resin, Leominster, Mass. are particularly preferred.

The stabilizers and preservatives incorporated in the present compositions help prevent premature decomposition of the materials during melt-processing (e.g. when making the articles of the present invention), storage, and use. They can include antioxidants, ultraviolet stabilizers, and other stabilizers, preservatives, etc. The ultraviolet stabilizers, must be compatible with the phosphorescent pigment, so that they do not inhibit its light-absorbing ability.

Preferred stabilizers and preservatives are hydroxybenzoate ultraviolet stabilizers, hindered phenolic anti-oxidants, and thioester stabilizers, usually lower alkyl thioesters of carboxylic acis. Particularly preferred are 2,4-di-tertiary butylphenyl-3,5-di-tertiary butyl-4-hydroxybenzoate (DTHB), Vanox 1290, a hindered phenolic anti-oxidant sold by R. T. Vanderbilt Company, Norwalk, Conn., and manufactured by Schnectedy Chemicals Co. DTHB can be purchased from R. T. Vanderbilt Co. A combination of an ultraviolet stabilizer, a hindered phenolic anti-oxidant and a thioester stabilizer is preferred.

In addition, the present compositions preferably include precipitated finely divided silica as a flow modifier to permit easier handling of the mixture during manufacture of the composition by a dry blending process. Silica and other materials may also be used as fillers. Such fillers include limited amounts of sawdust, ground cork, fibrous fillers, such as cellulosic polyester or acrylic fibers, or, preferably, nepheline syenite, supplied by Smith Chemical & Color Co., Jamaica, N.Y. Clay, talc, titanium dioxide, carbon black, calcium carbonate and other pigments commonly used as fillers are not desirable for use in the present invention because they interfere with the intensity of the phosphorescence and the duration of the afterglow. Silica as a flow modifier (and to a limited degree as an extender), in combination with nepheline syenite as an extender, is particularly preferred.

The content of the present compostion in each of the above ingredients is as follows:

elastomer: 25 to 75% by weight, preferably 25-35% by weight.
processing oil: 20-50% by weight, preferably 20-30% by weight.
modifying polymer(s): 0-25% by weight, preferably 5-15% by weight.
phosphoresent pigment: 3-30% by weight preferably 3-10% by weight.
stabilizer(s): 0.005-1.0% by weight, preferably consisting of a mixture of stabilizers within the same weight range.
dry blend flow modifier: 0-20% by weight, preferably 5-15% by weight.
filler: the balance.

The invention is further described below in particular examples, which are intended to illustrate the present invention, but not to limit its scope.

EXAMPLE 1

The following ingredients and proportions were used to prepare a phosphorescent thermoplastic elastomer for use in making shoe soles in accordance with the present invention:

| PERCENT | INGREDIENT | FUNCTION AND CHEMICAL TYPE |
|---|---|---|
| 47.4 | Kraton 4122 | Oil Extended Styrenic Block Copolymer (Elastomer) |
| 17.2 | Processing Oil | Naphthenic Hydrocarbon oil (plasticizer/extender) |
| 5.2 | Amoco Resin 18-290 | Poly-(alpha-methylstyrene) resin (modifying polymer) |
| 11.2 | Polysar 220 | Crystal polystryene (modifying polymer) |
| 8.3 | Ultrasil VN-3 | Precipitated finely divided Silica (dry blend flow modifier and extender) |
| 10 | Phosphorescent Pigment | Zinc sulfide copper compound |
| 0.06 | DTHB | Hydroxybenzoate (ultraviolet stabilizer) |
| 0.12 | VANOX 1290 | Hindered phenolic anti-oxidant (stabilizer/preservative) |
| 0.12 | Dilaurylthiodipropionate | Thioester (stabilizer/preservative) |

Kraton 4122 in the above table contains 35% of an extending oil (plasticizer). Thus, the net percent polymer in the foregoing composition is 30.8% and the percentage of oil is 32.8%.

The compositions of the present invention can be made by well-known dry-blending and/or melt-processing techniques. They are preferably made as follows:

The elastomer, in powder form, is charged into a high power mixer and heated mechanically to about 115° F.

Processing oil is added and vigorously mixed into a powder at about 130° F.

Polymer modifiers are then added and mixed at a low speed to become uniformly distributed within the blend. Addition of stabilizers and colorants follows. Flow modifiers are added last to convert the blend to free-flowing finely divided powder.

The thus prepared powder is then melt-mixed as follows: the mixture is heated to melt the polymeric ingredients (at about 150° C.). This is preferably accomplished in a plastication-extrusion helical screw mixer, such as a Welex 4½ inch single screw extruder made by Welex Inc., Bluebell, Pa.

Most of the heat is supplied by the mechanical mixing action but a supplemental source of heat may also be employed to compensate for heat loss to the environment. In this step, the solid ingredients are preferably mixed with the melting ingredients as thoroughly as possible.

The material is then converted to a form that is suitable for further processing, such as extrusion, injection molding, etc. A particularly preferred form to make shoes and shoe soles is pellet form, as is well known in the art.

The process of making the sole requires a mold to be used in an injection molding machine; the mold determines the dimensional features of the sole; the injection molding machine melts the thermoplastic rubber and conveys it as a fluid into the mold.

The mold design is determined by aesthetic (style) considerations, strength of the sole required as well as durability in wear, desired efficiency of the molding process, molding material and material used to fabricate the mold. Mold making materials are metals and composite materials known in the mold design field. Shoe sole molds are preferably machined from aluminum or cast from aluminum.

The injection molding machine consists of a mold holder and clamping mechanism to hold the mold shut with pressure and a mechanism for melting and conveying the thermoplastic material into the mold. The holder may be arranged to open and shut the mold by moving the mold parts horizontally or preferably vertically, according to well-known methods.

The molding material is fed through a hopper to a helical screw which simultaneously conveys pellets of the composition of the present invention, mixes the pellets into a melted form and meters the fully melted material into the mold. The screw is mounted in a heated barrel which contains the molding material. The material is simultaneously conveyed by the screw and heated to between 250° F.–350° F. by the mechanical friction imposed by the screw and by the heat from the barrel. In the simplest form of screw machine heating, conveying and injection are performed in one operation when the screw turns.

The machine is designed to fill the mold using the screw, stop the screw when the mold is filled, open the mold— after the material has solidified—and permit removal of the molded sole. The mold is then filled again. Machine types are described as melt pumps, plunger machines and reciprocating screw machines. After removal from the mold, soles are cooled by immersion in water and then dried and packaged for use in making shoes.

| Typical Properties of a Shoe Sole Manufactured in Accordance with the Present Invention | | |
|---|---|---|
| Property | | |
| Hardness | 54 | shore $A_{10}$ (ASTM) |
| Density | 1.00 | gm/cc |
| Ross flex | +500 M | Flexes to 500% cut growth |
| Adhesion | 50 | pounds per inch width |
| Tear Strength | 125 | pounds per inch |
| Taber Abrasion | 800 | mg loss (H-18 wheel at 1000 cycles) |
| Tensile Strength | 525 | psi |
| Tensile Modulus | 250 | psi @ 100% elongation |
| Ultimate elongation | 350 | % |

The above invention has been described with reference to particular embodiments. In light of the above description, however, it will be obvious to those of ordinary skill in the art that many modifications, additions, and deletions are possible without departing from the scope or the spirit of the present invention as claimed below.

What is claimed is:

1. A phosphorescent shoe sole made in whole or in part from a composition comprising
   (a) about 25–75% by weight of an elastomeric polymer selected from the group consisting of styrenic block copolymers suitable for making footwear, footwear soles, and other footwear parts;
   (b) about 20–50% by weight of a processing oil selected from the group consisting of napthenic hydrocarbon oils suitable for use as polymer plasticizers and extenders and mixtures thereof;
   (c) about 0.005–1% by weight of a stabilizer selected from the group consisting of hydroxybenzoate ester ultraviolet stabilizers, hindered phenolic antioxidant compounds, thioesters or carboxylic acids, and mixtures thereof; and
   (d) about 3–30% by weight of a phosphorescent compound, capable of imparting phosphorescent properties to said composition and articles made therefrom.

2. The shoe sole of claim 1, said composition further comprising
   (e) about 0–25% of a modifying polymer selected from the group consisting of high density polyethylene, ethylene vinyl acetate, poly-(alpha-methylstyrene) resin, polybutadiene resin, high styrene resin, crystal polystyrene, high impact styrene resin polymers and copolymers, and mixtures thereof; and
   (f) about 0–20% precipitated, finely divided silica.

3. The shoe sole of claim 2, said composition further comprising a filler selected from the group consisting of nepheline syenite, cellulosic fibers, polyester fibers, acrylic fibers, sawdust, and ground cork.

4. The shoe sole of claim 3, said composition comprising about 25–35% of said elastomeric polymer, about 20–30% of said processing oil, about 0.005–1% of said stabilizer, about 3–10% of said phosphorescent compound, about 5–15% of said modifier and about 5–15% of said silica.

5. The shoe sole of claim 4, wherein said elastomeric polymer is an oil-extended polystyrene polybutadiene block copolymer, said modifying polymer is poly-(alpha-methylstyrene) resin and crystal polystyrene, said stabilizer comprises 2,4-di-tertiary butylphenyl-3,5-di-tertiary butyl-4-hydroxybenzoate, a hindered phenylic anti-oxidant and dilaurylthiodipropionate, and said flow modifier is precipitated silica.

6. The shoe sole according to claim 5, wherein said composition contains about 0.005–0.06% of said hydroxybenzoate, 0.005.0.5% of said anti-oxidant and 0.005–0.5% of said dilaurylthiodipropionate.

7. A phosphorescent shoe sole according to claim 1, 2, 3, 4, 5 or 6, said sole being made by injection molding.

8. A phosphorescent shoe sole according to claim 7 said injection molding comprising melting said composition by heating it to between about 250°–350° F., injecting said heated composition into a mold, filling said mold, waiting for the injected composition to solidify and opening said mold.

* * * * *